US008717634B2

(12) United States Patent
Genda (10) Patent No.: US 8,717,634 B2
(45) Date of Patent: May 6, 2014

(54) IMAGE PROCESSING DEVICE AND AN IMAGE PROCESSING METHOD OF CORRECTION OF FRONT END FADING OR SWEEPUP ADAPTED TO THE STATE OF THINNING

(75) Inventor: Daisuke Genda, Kawasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 3 days.

(21) Appl. No.: 13/586,121

(22) Filed: Aug. 15, 2012

(65) Prior Publication Data

US 2013/0057924 A1 Mar. 7, 2013

(30) Foreign Application Priority Data

Sep. 5, 2011 (JP) ................................ 2011-192491

(51) Int. Cl.
*G06K 15/00* (2006.01)
*H04N 1/00* (2006.01)
*H04N 1/60* (2006.01)
*H04N 1/407* (2006.01)

(52) U.S. Cl.
USPC ........... 358/3.27; 358/1.18; 358/1.6; 358/1.9; 358/2.1

(58) Field of Classification Search
USPC ........... 358/3.27, 1.9, 1.6, 2.1, 1.18, 1.1, 504, 358/509, 515, 518, 523, 520, 530, 537, 448, 358/452, 462; 382/199, 167, 198, 200, 190, 382/203, 204, 292, 162, 164, 165, 173, 228, 382/274
See application file for complete search history.

(56) References Cited

U.S. PATENT DOCUMENTS

| 5,583,949 | A | * | 12/1996 | Smith et al. | 382/199 |
| 8,135,174 | B2 | * | 3/2012 | Wiedemann et al. | 382/103 |
| 2003/0053689 | A1 | * | 3/2003 | Watanabe et al. | 382/167 |
| 2010/0040291 | A1 | * | 2/2010 | Genda et al. | 382/199 |
| 2012/0026554 | A1 | * | 2/2012 | Genda | 358/3.27 |

FOREIGN PATENT DOCUMENTS

| JP | 2005-341249 A | 12/2005 |
| JP | 2009-058765 A | 3/2009 |

OTHER PUBLICATIONS

Daiki, Image Forming Apparatus Image Processing Method and Storage Medium, Mar. 19, 2009, Machine Translation Japanese Patent Publication, JP2009058765, all pages.*
Koji, Image Processing Appratus, Aug. 12, 2005, Machine Translation Japanese Patent Publication, JP2005341249, all pages.*

* cited by examiner

*Primary Examiner* — Ngon Nguyen
(74) *Attorney, Agent, or Firm* — Holtz, Holtz, Goodman & Chick, PC (57) ABSTRACT

Provided is an image processing device including: an outline detection unit which analyzes image data to detect an outer edge pixel forming the outline of image, and to determine an edge direction of the outer edge pixel; a thinning unit which processes thinning by reducing a pixel value of the outer edge pixel; and an outline adjusting unit. The outline adjusting unit determines a correction value of front end fading to be adopted to the outer edge pixel, depending on sheet-feeding direction when the image data is printed and the edge direction of the outer edge pixel; reduces the correction value of front end fading, depending on the ratio of reduction by the thinning of the pixel value of the outer edge pixel; and corrects the front end fading by adding the reduced correction value to the pixel value of the outer edge pixel.

20 Claims, 7 Drawing Sheets

← SHEET-FEEDING DIRECTION

IMAGE PROCESSING DEVICE AND AN IMAGE PROCESSING METHOD OF CORRECTION OF FRONT END FADING OR SWEEPUP ADAPTED TO THE STATE OF THINNING

BACKGROUND OF THE INVENTION

1. Field of the Invention

The present invention relates to an image processing device and an image processing method.

2. Description of Related Art

Images printed on sheets of paper using conventional printers based on the electronic photograph system have occasionally been found to cause variation in density, as if toner has been swept up. This is because the density of images, containing characters and figures, decreases on the front end side of the sheet-feeding direction, and increases on the rear end side. Mode of density variation characterized by decreased density on the front end side is generally called "front end fading", and increased density on the rear end side is generally called "sweep-up".

As a solution for the sweep-up problem, there has been disclosed a method of producing a correction object by which sweep-up is less recognizable (see Japanese Laid-Open Patent Publication No. 2009-58765, for example). According to the method, density in regions where the sweep-up is readily recognizable is adjusted depending on color of the object, angle of outline of the object away from the sheet-feeding direction, and so forth.

In general, images including characters, required to be sharp, are often processed by thinning, for reducing pixel values on the outline of images, or by emphasizing outlines of characters (see Japanese Examined Patent Publication No. 4189467, for example).

Effect of the thinning is, however, not attainable in the swept-up image, since the density of characters increases on the rear end side of the sheet-feeding direction. Conversely, in case of front end fading, the effect of thinning will be excessive since the decreased density by the front end fading is further decreased by the thinning. Accordingly, given that the image per se is originally thin, such image would occasionally fade or disappear due to excessive thinning.

As described in the above, not only thinning, but also correction of sweep-up and front end fading are categorized as the processing of increasing or decreasing pixel values of pixels on the outlines of image, so that it has been difficult to attain both of thinning and correction of sweep-up or the like at the same time.

SUMMARY OF THE INVENTION

It is therefore an object of the present invention to provide a method of correction of front end fading or sweep-up, adapted to the state of thinning.

According to a first aspect of the present invention aimed at attaining the object described in the above, there is provided an image processing device which includes: an outline detection unit which analyzes image data to detect an outer edge pixel forming the outline of image, and to determine an edge direction of the outer edge pixel; a thinning unit which processes thinning by reducing a pixel value of the outer edge pixel; and an outline adjusting unit. The outline adjusting unit determines a correction value of front end fading to be adopted to the outer edge pixel, depending on sheet-feeding direction when the image data is printed and the edge direction of the outer edge pixel; reduces the correction value of front end fading, depending on the ratio of reduction by the thinning of the pixel value of the outer edge pixel; and corrects the front end fading by adding the reduced correction value to the pixel value of the outer edge pixel.

According to a second aspect of the present invention, there is provided an image processing device which includes: an outline detection unit which analyzes image data to detect an outer edge pixel forming the outline of image, and to determine an edge direction of the outer edge pixel; a thinning unit which processes thinning by reducing a pixel value of the outer edge pixel; and an outline adjusting unit. The outline adjusting unit determines a correction value of sweep-up to be adopted to the outer edge pixel, depending on sheet-feeding direction when the image data is printed and the edge direction of the outer edge pixel; reduces the correction value of sweep-up, depending on the ratio of reduction by the thinning of the pixel value of the outer edge pixel; and corrects the sweep-up by adding the reduced correction value to the pixel value of the outer edge pixel.

According to a third aspect of the present invention, there is provided an image processing method which includes: detecting an outer edge pixel forming the outline of image from the individual pixels of image data; determining the edge direction of the outer edge pixel; thinning the detected outer edge pixel by reducing a pixel value of the outer edge pixel; determining a correction value of sweep-up to be adopted to the outer edge pixel, depending on sheet-feeding direction when the image data is printed and the edge direction of the outer edge pixel; reducing the correction value of sweep-up, depending on the ratio of reduction by the thinning of the pixel value of the outer edge pixel; and correcting the sweep-up by adding the reduced correction value to the pixel value of the outer edge pixel.

According to a fourth aspect of the present invention, there is provided an image processing method which includes: detecting an outer edge pixel forming the outline of image from the individual pixels of image data; determining the edge direction of the outer edge pixel; thinning the detected outer edge pixel by reducing a pixel value of the outer edge pixel; determining a correction value of sweep-up to be adopted to the outer edge pixel, depending on sheet-feeding direction when the image data is printed and the edge direction of the outer edge pixel; reducing the correction value of sweep-up, depending on the ratio of reduction by the thinning of the pixel value of the outer edge pixel; and correcting the sweep-up by adding the reduced correction value to the pixel value of the outer edge pixel.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENT

Embodiment of the image processing device and the method of image processing of the present invention will be explained, referring to the attached drawings.

Figure 1:
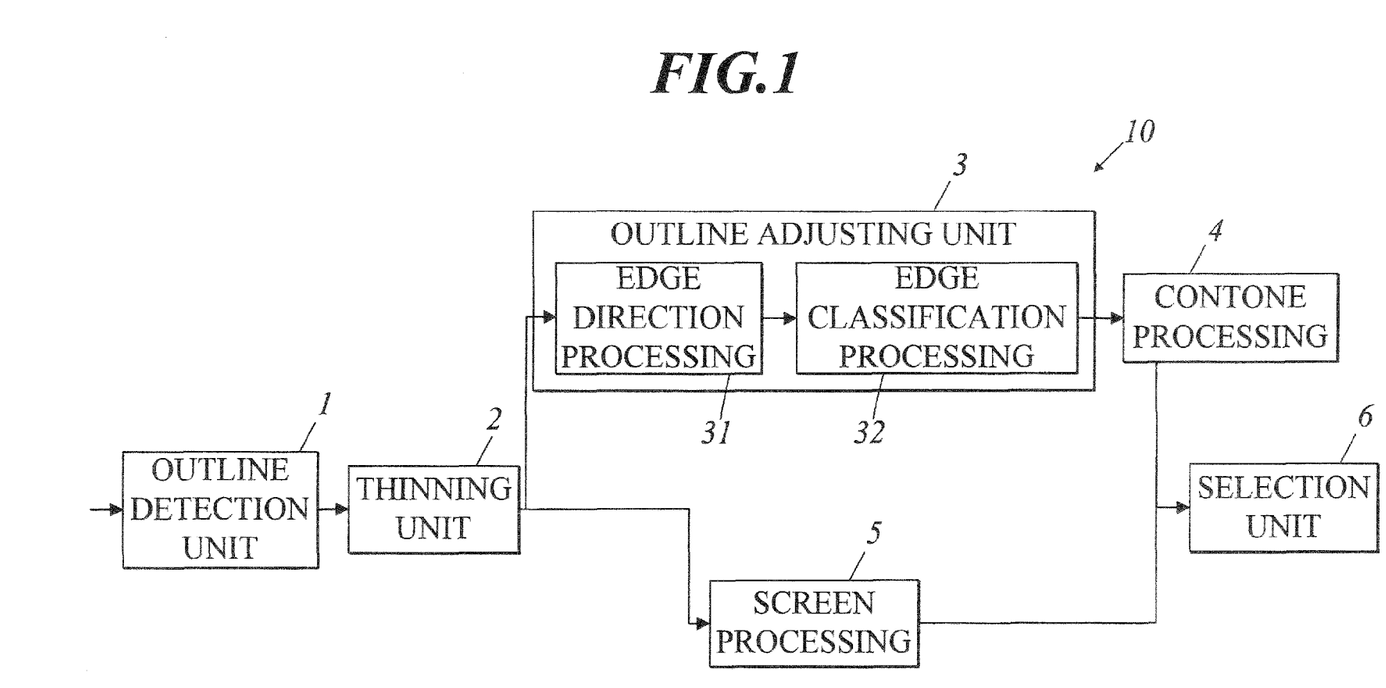
FIG. 1 is a configuration chart of an image processing device according to one embodiment.

FIG. 1 illustrates an image processing device 10 of this embodiment.

The image processing device 10 subjects received image data to thinning and screen processing, and then output the result. The image processing device 10 may be incorporated into a printing device which implements printing, such as a copying machine, MFPs (Multi-Functional Peripherals) and so forth. The image processing device 10 is also capable of correcting front end fading and sweep-up ascribable to printing characteristics of the printing device.

The image processing device 10 has, as illustrated in FIG. 1, an outline detection unit 1, a thinning unit 2, an outline adjusting unit 3, a contone (continuous tone) processing unit 4, a screen processing unit 5, and a selection unit 6.

The outline detection unit 1 analyzes the image data to detect edge pixels which form the outline of image, and to determine the edge direction and edge classification. The edge direction means a direction from a pixel with a small pixel value towards a pixel with a large pixel value. The edge pixels are classified by the edge classification thereof into outer edge pixels and inner edge pixels, wherein the outer edge pixels are edge pixels forming an outline of image, and the inner edge pixels are edge pixels forming an outline recessed by one pixel from the outer edge pixels. Results of determination of the edge direction and the edge classification are output, together with the image data, to the thinning unit 2.

Figure 2:
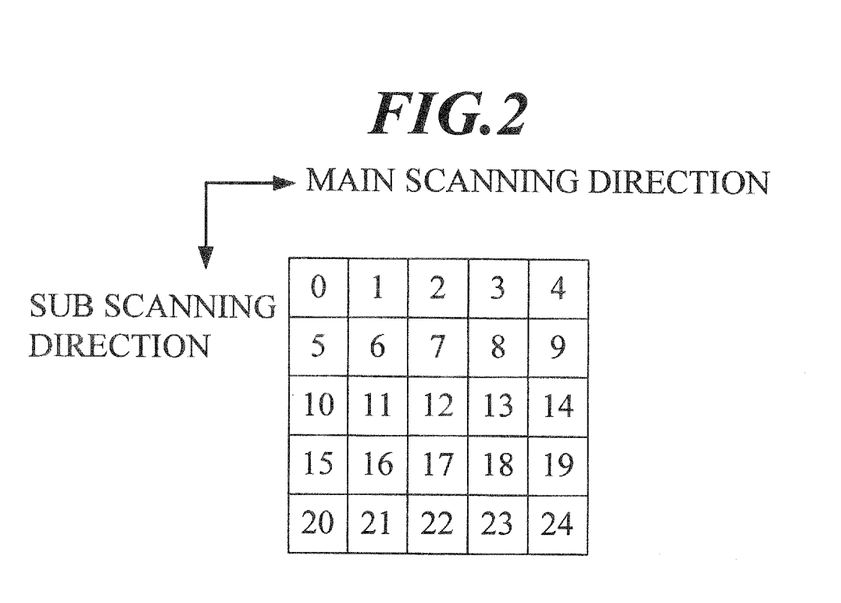
FIG. 2 is a drawing illustrating a 5×5 pixel matrix.

The outline detection unit 1 receives the image data by a unit of 5×5 pixel matrix, and targets the center pixel of the matrix.

FIG. 2 illustrates the 5×5 pixel matrix. In FIG. 2, a numeral given to each pixel denotes an identification number of each pixel. The outline detection unit 1 determines whether the target pixel at the center of the 5×5 pixel matrix, with identification number 12, is the edge pixel or not. If the target pixel is the edge pixel, then the edge direction and the edge classification are determined.

Method of determination will be detailed below.

First, the outline detection unit 1 respectively calculates differences SP of the pixel values between the target pixel and each of the peripheral pixels positioned next to the target pixel in the upper, lower, left and right directions; and also differences SF of the pixel values between the target pixel and each of peripheral pixels positioned two pixels away from the target pixel in the upper, lower, left and right directions.

Equations for calculation are as follows, wherein C represents a pixel value of each pixel given by a number in [ ].

$SP[u]=C[12]-C[7]$ $SP[l]=C[12]-C[11]$ $SP[r]=C[12]-C[13]$ $SP[d]=C[12]-C[17]$ $SF[u]=C[12]-C[2]$ $SF[l]=C[12]-C[10]$ $SF[r]=C[12]-C[14]$ $SF[d]=C[12]-C[22]$

Next, the outline detection unit 1 determines an edge direction value Px of the target pixel indicating an edge direction in the main scanning direction, based on the inequality relation between SP[r] and SP[l], and determines an edge direction value Py of the target pixel indicating an edge direction in the sub scanning direction, based on the inequality relation between SP[u] and SP[d]. Px and Py will have a value of −1, 0 or +1. 0 denotes absence of edge, and ±1 denotes presence of edge. Positive and negative signs indicate edge directions, wherein "−" indicates the leftward direction and "+" indicates the rightward direction, respectively in the main scanning direction. On the other hand, "+" indicates the upward direction and "−" indicates the downward direction, respectively in the sub scanning direction.

Figure 3A:
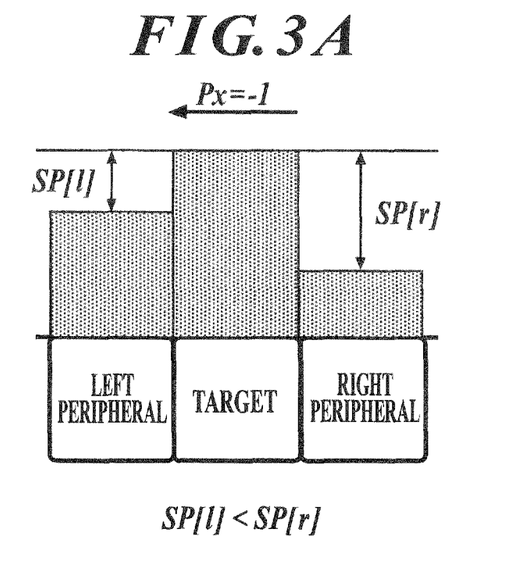
FIG. 3A is drawings illustrating examples of determination of edge directions of outer edge.
Figure 3B:
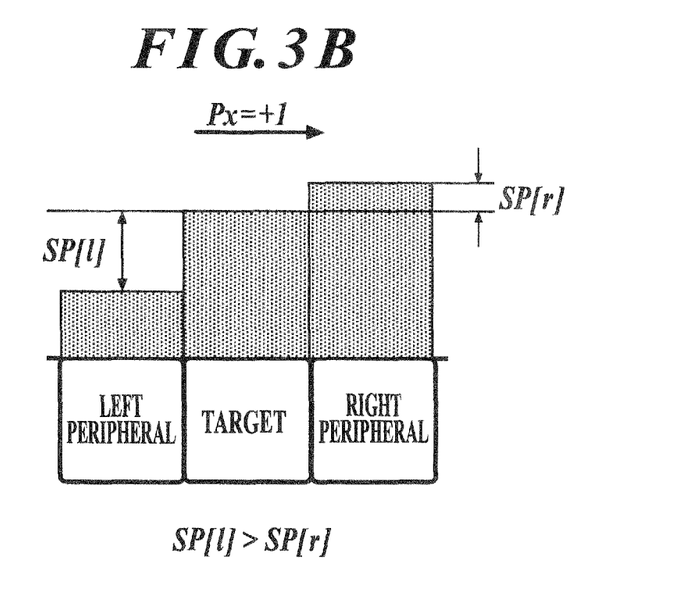
FIG. 3B is drawings illustrating examples of determination of edge directions of outer edge.

For example, if SP[l]<SP[r], as illustrated in FIG. 3A, the right peripheral pixel, out of both peripheral pixels located next on the left and right of the target pixel, has a smaller pixel value. Accordingly, the outline detection unit 1 determines the edge direction in the main scanning direction lies in the leftward direction, and outputs Px=−1. On the other hand, if SP[l]>SP[r], as illustrated in FIG. 3b, the left peripheral pixel, out of both peripheral pixels next on the left and right of the target pixel, has a smaller pixel value. Accordingly, the outline detection unit 1 determines the edge direction in the main scanning direction as the rightward, and outputs Px=+1. If SP[l]=SP[r], the outline detection unit 1 outputs Px=0.

Similarly, if SP[u]<SP[d], the outline detection unit 1 determines the edge direction in the sub scanning direction lies in the upper direction, and outputs Py=−1. On the other hand, if SP[u]>SP[d], the outline detection unit 1 determines the edge direction in the sub scanning direction as the downward, and outputs Py=+1. If SP[u]=SP[d], the outline detection unit 1 outputs Py=0.

If either the edge direction value Px or the edge direction value Py is +1 or −1, this means that there is a difference of pixel value between the peripheral pixels located vertically or laterally while being bounded by the target pixel. Accordingly, if either the edge direction value Px or the direction value Py is +1 or −1, the outline detection unit 1 determines that the target pixel is on the edge, and classifies it to the outer edge pixel.

Next, the outline detection unit 1 determines an overall edge direction value P (P=0 to 7) of the target outer edge pixel as listed below, based on combination of the edge direction value Px of the main scanning direction and the edge direction value Py of the sub scanning direction, and outputs the result as the edge direction value P of the target pixel.

Px=+1 and Py=−1, then P=4
Px=+1 and Py=0, then P=2
Px=+1 and Py=+1, then P=7
Px=0 and Py=−1, then P=0
Px=0 and Py=+1, then P=1
Px=−1 and Py=−1, then P=6
Px=−1 and Py=0, then P=3
Px=−1 and Py=+1, then P=5

Table below shows correlation between the edge direction value P and the edge direction. There are 8 edge directions, four in the vertical and lateral directions, and four in oblique directions.

TABLE 1

| P | EDGE DIRECTION |
|---|---|
| 0 | ↓ |
| 1 | ↑ |
| 2 | → |
| 3 | ← |
| 4 | ↘ |
| 5 | ↖ |
| 6 | ↙ |
| 7 | ↗ |

On the other hand, if Px=Py=0, this means that there is no difference of pixel value between the peripheral pixels adjacent to the target pixel, so that the target pixel is not the outer edge pixel, but may possibly be the inner edge pixel. The outline detection unit 1 then respectively compares SF[r] with SF[l], and compares SF[u] with SF[d], which were determined from the peripheral pixels located two pixels away from the target pixel in the upper, lower, left and right directions.

When SF[r]=SF[l] and SF[u]=SF[d], there is no difference of pixel value between the peripheral pixels located two pixels away from the target pixel, so that the outline detection unit 1 determines that the target pixel is not the inner edge pixel. Accordingly, the resultant determination is that the target pixel is neither the outer edge pixel nor the inner edge pixel, that is, not on the edge.

Figure 4:
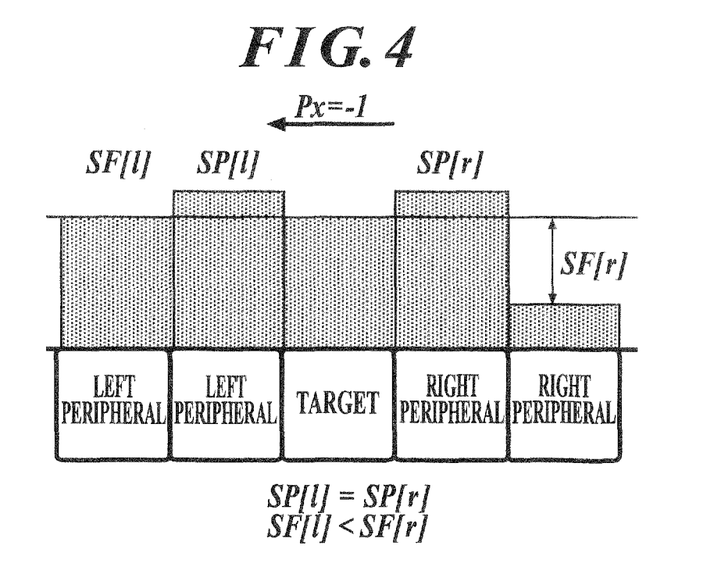
FIG. 4 is a drawing illustrating an example of determination of edge direction of inner edge.

If there is a difference between SF[r] and SF[l], or between SF[u] and SF[d], the outline detection unit 1 determines that the target pixel is the inner edge. The outline detection unit 1 herein determines, similarly to the case of the above-described outer edge pixel, the edge direction value Px of the main scanning direction based on the inequality relation between SF[r] and SF[l], and determines the edge direction value Py of the sub scanning direction based on the inequality relation between SF[u] and SF[d]. For example, when SP[l]=SP[r] but SF[l]<SF[r], as illustrated in FIG. 4, the outline detection unit 1 determines that the target pixel is the inner edge, and that the edge direction value Px of the main scanning direction lies in the leftward direction, and then outputs Px=−1. Finally, the outline detection unit 1 determines the overall edge direction value P of the inner edge based on the combinations of the edge direction values Px, Py, similarly as described in the above.

The thinning unit 2 subjects the received image data to thinning processing, so as to reduce the pixel values of the pixels which were determined by the outline detection unit 1 as the outer edge pixels. The thinned image data is then output together with results of determination of the edge, that is, the edge direction and the edge classification, to the outline adjusting unit 3. The thinned image data is also output to the screen processing unit 5.

The paragraphs below will explain an exemplary case of reducing the pixel values of the outer edge pixels, without specifically limiting the method of reduction. The pixel values may be reduced by a predetermined value, or may be reduced depending on the pixel values of the outer edge pixels.

In the thinning process, the thinning unit 2 interpolates the pixel value of an outer edge pixel, and the pixel value of a pixel located next to the pixel in the direction opposite to the edge direction, to calculate the pixel value of the outer edge pixel after being thinned. A calculation formula is given below.

$$C[OEs]=C[OE]\times f/100+C[PA]\times(100-f)/100$$

In the formula, C[OEs] represents a pixel value of the outer edge pixel after being thinned, C[OE] represents an original pixel value of the outer edge pixel, and C[PA] represents a pixel value of a pixel located next to the pixel in the direction opposite to the edge direction.

f is a coefficient which represents a thinning strength (%) having a value from 0 to 100. f may be set in an arbitrary manner, typically to 70% when the degree of thinning is desired to be increased, and typically to 30% when the degree of thinning is desired to be reduced.

For an exemplary case, as illustrated in FIG. 2, where the pixel with identification number 12 is the outer edge pixel, and the edge direction value P has a value of 2 indicating the rightward direction, a pixel located next thereto in the direction opposite to the edge direction is the one with identification number 11. When the thinning strength is set to 30% (f is set to 30 in the above formula), a pixel value of 30% of the pixel with identification number 12 and a pixel value of 70% of the pixel with identification number 11 are summed, and the result is output as a pixel value of the pixel with identification number 12 after being thinned. The pixel value of the outer edge pixel may be reduced in this way, by incorporating the pixel value of a pixel neighboring in the direction opposite to the edge direction, in other words, a background pixel whose pixel value is smaller than that of the outer edge pixel, into the pixel value of the outer edge pixel which is a foreground pixel.

The outline adjusting unit 3 has, as illustrated in FIG. 1, an edge direction processing unit 31 and an edge classification processing unit 32.

The edge direction processing unit 31 corrects front end fading or sweep-up, by adding a correction value of front end fading or a correction value of sweep-up, to the pixel value of a pixel, out of the individual pixels of the thinned image data having been determined as being the edge pixel. All edge pixels, irrespective of whether they are the outer edge pixel or the inner edge pixel, may be targets of correction. The edge direction processing unit 31 reduces the correction value of front end fading or the correction value of sweep-up, according to the ratio of reduction by thinning of the pixel value on the outer edge.

Figure 5:
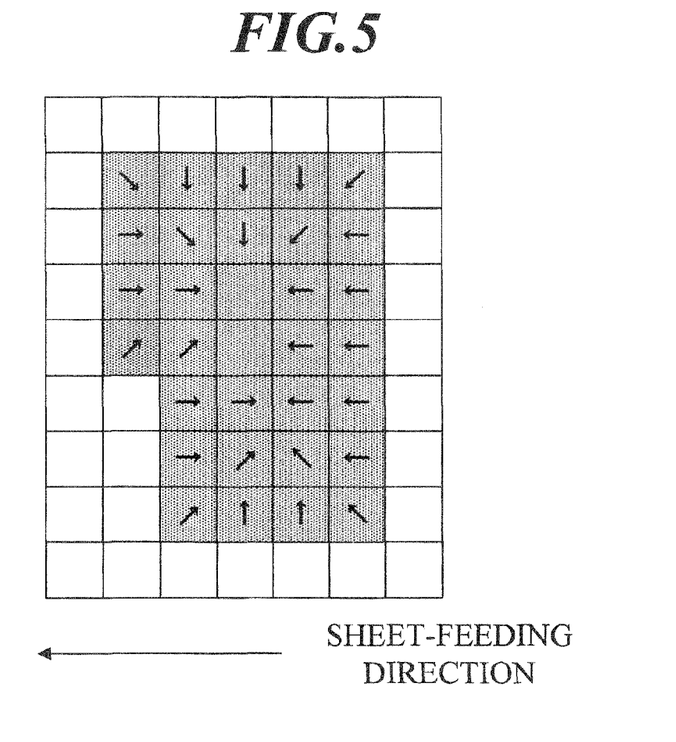
FIG. 5 is a drawing illustrating an image with the edge directions.

FIG. 5 illustrates edge directions determined for an exemplary image.

As exemplified by FIG. 5, pixels on the front end side of the sheet-feeding direction, where front end fading is likely to occur, have the edge directions P thereof in the direction opposite to the sheet-feeding direction, or oblique directions close to the opposite direction. On the other hand, pixels on the rear end side of the sheet-feeding direction, where sweep-up is likely to occur, have the edge directions P thereof same with the sheet-feeding direction or oblique directions close to the sheet-feeding direction.

Accordingly, the edge direction processing unit 31 determines targets for correction of front end fading or sweep-up, and the correction values therefor, based on the sheet-feeding direction and the edge direction value P in the process of printing of the image data.

The edge direction processing unit 31 determines the outer edge pixels or the inner edge pixels, with edge direction values P of 2, 4 and 7, as the targets for correction of front end fading, and gives positive values as the correction values of front end fading. By adding the positive correction values, the density value possibly reduced due to the front end fading may be compensated.

On the other hand, the edge direction processing unit 31 determines the outer edge pixels or the inner edge pixels, with edge direction values P of 3, 5 and 6, as the targets for correction of sweep-up, and gives negative values as the correction values for sweep-up. By adding the negative correction values, the density possibly increased due to the sweep-up may be canceled.

More specifically, the edge direction processing unit 31 holds a plurality of different correction values for the front end fading and sweep-up, and selects the correction value from them, depending on the sheet-feeding direction, and the edge direction values P of the pixels determined as being the outer edge pixels and the inner edge pixels. Changes in density of image due to the front end fading and sweep-up tend to be expressed larger when the sheet-feeding direction and the edge direction value P lie closer. For this reason, degrees of correction herein are designed to be changed depending on the degrees of change in density due to front end fading and sweep-up, by selectively adopting different correction values as illustrated in FIG. 6, rather than adopting a single correction value respectively to front end fading and to sweep-up.

Figure 6:
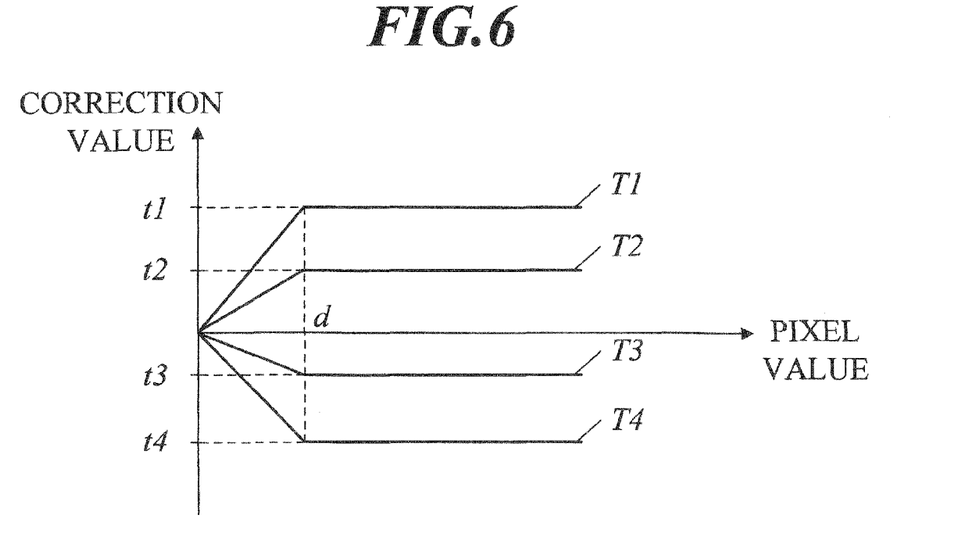
FIG. 6 is a drawing illustrating an example of a plurality of different correction values.

FIG. 6 illustrates an example of a plurality of different correction values.

As seen in FIG. 6, there are four correction values Tn (n=1 to 4), including two levels of positive correction values T1, T2, and two levels of negative correction values T3, T4. The correction values T1, T2 may be determined experimentally or empirically, by predicting the density value of image expected to decrease by front end fading in the process of printing, so as to compensate the amount of reduction. Similarly, the correction values T3, T4 may be determined experimentally or empirically, by predicting the density value of image expected to increase by sweep-up, so as to cancel the amount of increase.

As is known from FIG. 6, the individual correction values Tn are constant values tn (n=1 to 4) when the pixel values to be added with the correction values Tn are larger than a predetermined value d, but are values obtained respectively by multiplying the slope tn/d with the pixel values when the pixel values are in a low density range from 0 or more to d or less.

By adopting absolute values of the correction values Tn smaller to some degree from absolute values of the constant value tn in the low density range, degradation in quality of image due to correction is avoidable. While the correction values Tn are added to the pixel values of the outer edge pixels and on the inner edge pixels, abrupt changes in the pixel values are visually outstanding in the low density region. As described in the above, in the low density region, the degrees of change in the pixel values of the edge pixels due to addition of the correction values Tn is moderated by using the correction values appropriately reduced in the absolute values according to the pixel values, in place of using the constant value tn, so as to avoid degradation in image quality due to correction.

When the edge direction values P of the outer edge pixels and the inner edge pixels are given by P=2, the edge direction processing unit 31 determines the positive correction value T1, having the largest degree of correction, as the correction values of front end fading for the pixels. When the edge direction values P are given by P=4 or P=7, the edge direction processing unit 31 determines the positive correction value T2, having the second largest degree of correction, as the correction values of front end fading for the pixels.

When the edge direction values P of the outer edge pixels and the inner edge pixels are given by P=3, the edge direction processing unit 31 determines the negative correction value T4, having the largest degree of correction, as the correction values of sweep-up for the pixels. When the edge direction values P are given by P=5 or P=6, the edge direction processing unit 31 determines the negative correction value T3, having the second largest degree of correction, as the correction values of sweep-up for the pixels.

For the pixels having the edge direction values P given by P=0 or P=1, the edge direction processing unit 31 determines the correction values 0. In other words, the pixels having the edge direction values P indicating the edge directions normal to the sheet-feeding direction are out of range of correction.

Once the correction values Tn adapted to the edge directions P are determined, the edge direction processing unit 31 reduces the correction values Tn determined for the pixels on the outer edge, depending on the ratio of reduction by thinning of the pixel values of the outer edge pixels. One possible method is such as simply reducing the correction value Tn proportional to the ratio of reduction, so as to make the correction value Tn more largely reduced as the ratio of reduction increases, and another possible method of reducing the correction value Tn is such as assigning the correction value Tn of one outer edge pixel to two pixels, including the outer edge pixel and an inner edge pixel adjacent thereto in the edge direction. In this case, the correction value Tn, having been determined for the outer edge pixel, is divided depending on the ratio of reduction by thinning of the pixel value, and the resultant values are respectively assigned to the outer edge pixel, and to the inner edge pixel.

Since the inner edge pixel is not a target pixel for thinning, so that the ratio of pixel value of the inner edge pixel remained after thinning is 100%. Assuming now that the ratio of reduction by thinning of the pixel value on the outer edge pixel as $x$ %, the ratio of pixel value of the outer edge pixel remained after the thinning is given by $(100-x)$ %. The edge direction processing unit 31 divides the correction value Tn, determined for the outer edge pixel, into $Tn \times (100-x)/\{100+(100-x)\}$ and $Tn \times 100/\{100+(100-x)\}$. The edge direction processing unit 31 assigns $Tn \times (100-x)/\{100+(100-x)\}$, out of the two divided correction values, to the outer edge pixel, and assigns $Tn \times 100/\{100+(100-x)\}$ to the inner edge pixel.

Accordingly, if $x=0$%, neither the inner edge pixel, nor the outer edge pixel is thinned, so that a correction value of $(\frac{1}{2})Tn$ is equally assigned to the pixels on the inner edge and on the outer edge. If $x=50$%, the inner edge pixel is assigned with a correction value of $(\frac{2}{3})Tn$, and the outer edge pixel is assigned with a correction value of $(\frac{1}{3})Tn$. If $x=100$%, the outer edge pixel is thinned and has a pixel value of 0, so that the whole correction value Tn is assigned to the inner edge pixel.

The edge direction processing unit 31 adds a correction value of $Tn \times (100-x)/\{100+(100-x)\}$, having been divided from the correction value Tn and assigned to the outer edge pixel, to the pixel value of the outer edge pixel. The edge direction processing unit 31 also adds a correction value of $Tn \times 100/\{100+(100-x)\}$ having been divided from the correction value Tn and assigned to the inner edge pixel, to the pixel value of the inner edge pixel.

By dividing the correction value Tn, and by assigning one of the resultant values to the outer edge pixel, the ratio of the correction value Tn to be added to the pixel value of the outer edge pixel may be reduced. The larger the ratio of reduction by thinning of the pixel value will be, the smaller the ratio of the correction value Tn to be assigned to the pixel value of the outer edge pixel will be, so that the degree of correction may be reduced in proportion to the strength of thinning. Accordingly, the both of thinning and correction of front end fading or sweep-up are attainable at the same time.

More specifically, if front end fading is corrected after thinning, since the pixel value, once reduced by thinning, is increased again by the correction of front end fading which is implemented by adding the positive correction value T1 or T2, so that the effect of thinning may be only limitative. In contrast, according to this embodiment, the effect of thinning may be ensured while successfully implementing correction of front end fading, since the positive correction value T1 or T2 to be added to the pixel value of the outer edge pixel becomes smaller, as the strength of thinning becomes larger.

On the other hand, if sweep-up is corrected after thinning, since the pixel value, once reduced by thinning, is further reduced by the correction of sweep-up which is implemented by adding the negative correction value T3 or T4, so that the effect of thinning may be excessive. In contrast, according to this embodiment, the excessive thinning is avoidable while successfully implementing correction of sweep-up, since the absolute value of negative correction value T3 or T4 to be added to the pixel value of the outer edge pixel becomes smaller, as the strength of thinning becomes larger.

In addition, by assigning the other one of the divided correction value Tn to the inner edge pixel, the effect of correction may be expressed by two pixels on the inner edge and on the outer edge.

As described in the above, in the correction of front end fading, the effect of thinning is not fully obtained despite the pixel value of the outer edge pixel has largely been reduced, if the pixel value for correcting front end fading is increased. Accordingly, by allowing the inner edge pixel to share a part of positive correction values T1 or T2, to thereby increase the pixel value of the inner edge pixel, the effect of correction of front end fading may be expressed by two pixels including the outer edge pixel and the inner edge pixel, while ensuring a good effect of thinning by the outer edge pixel.

On the other hand, in the correction of sweep-up, the effect of correction is less likely to be exhibited, if the pixel value of the outer edge pixel has already been reduced by thinning to a large degree, since the pixel value no longer has a sufficient margin of reduction for correction of sweep-up. In contrast, by allowing the inner edge pixel to share a part of negative correction value, to thereby decrease the pixel value on the inner edge pixel, the effect of correction of sweep-up may be expressed by two pixels including the outer edge pixel and the inner edge pixel, while ensuring a good effect of thinning by the outer edge pixel.

The edge classification processing unit 32 implements gamma correction of the image data, having been corrected in front end fading or sweep-up by the edge direction processing unit 31, depending on whether the pixel is the outer edge pixel or the inner edge pixel. The image data after the gamma correction is output to the contone processing unit 4.

Figure 7A:
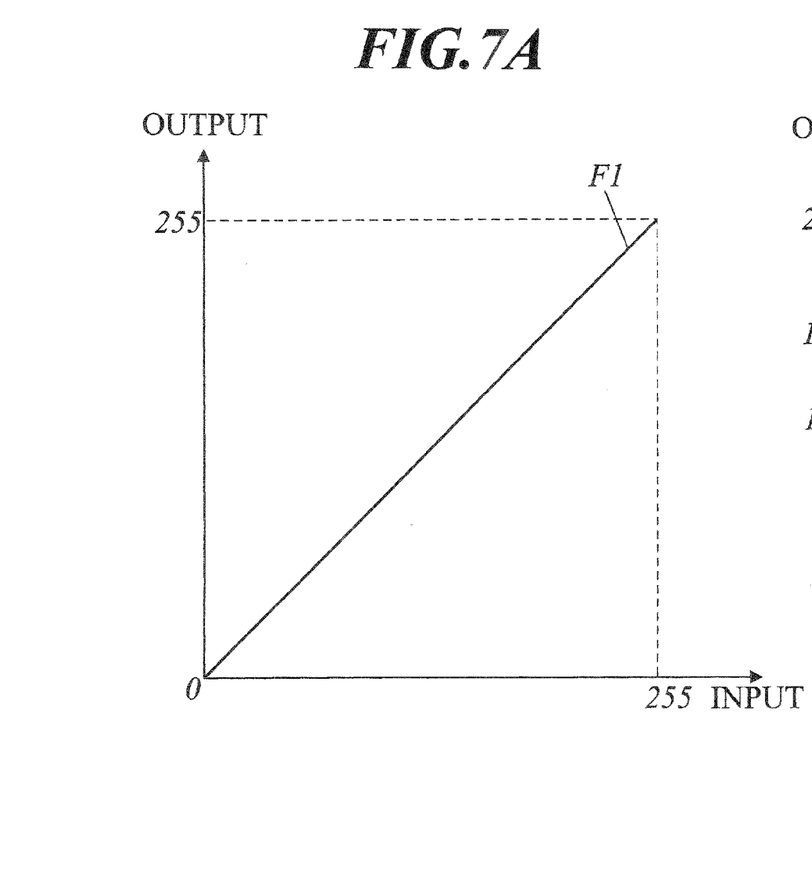
FIG. 7A is a drawing illustrating a correction function used for gamma correction of outer edge pixels.

The edge classification processing unit 32 implements the gamma correction of the outer edge pixels, using a correction function F1 illustrated in FIG. 7A. The correction function F1 illustrated in FIG. 7A represents a 1:1 relation between the input and output. In other words, input pixel values are output without modification.

Figure 7B:
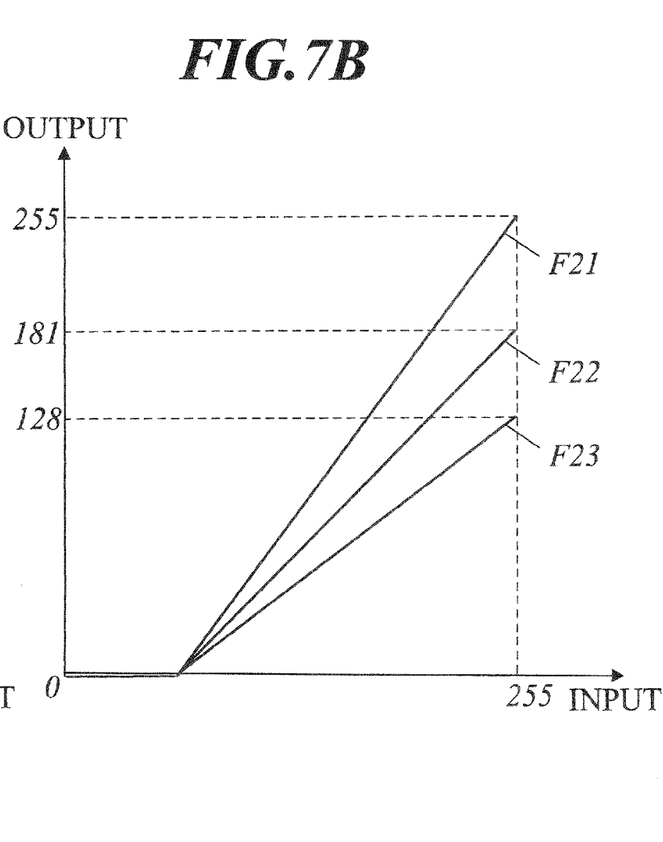
FIG. 7B is a drawing illustrating correction functions used for gamma correction of pixels on the inner edge.

On the other hand, there are three correction functions F21 to F23 for correction of the pixels on the inner edge, as illustrated in FIG. 7B. The edge classification processing unit 32 implements gamma correction of the inner edge pixels, using any one of the three correction functions F21 to F23. Which function is to be used may arbitrarily be set, or may be set by the user.

The outline composed of the outer edge pixels and the inner edge pixels is emphasized by the succeeding contone processing. In order to maintain the effect of thinning even after the contone processing, the pixel values of the outer edge pixels are output without being adjusted by the gamma correction.

On the other hand, the pixel values of the inner edge pixels are adjustable by appropriately selecting the correction functions F21 to F23. If the pixel values of the outer edge pixels become closer to 0 by thinning, the inner edge pixels are visually recognized as the outermost outline. The plurality of correction functions F21 to F23 are therefore made available, so as to allow the user to adjust the degree of outline emphasis by the inner edge pixels. Since the degree of outline emphasis is given by a decreasing order of correction function F21>correction function F22>correction function F21, so that the correction functions F21 to F23 are selectively used depending on to what degree of emphasis is necessary.

The contone processing unit 4 implements contone processing of the image data output from the outline adjusting unit 3, and outputs the result to the selection unit 6. The contone processing refers to a processing for outputting the image data without modification.

The screen processing unit 5 implements screen processing of the image data output from the thinning unit 2. The image data after the screen processing is then output to the selection unit 6.

The selection unit 6 selects, based on result of determination by the outline detection unit 1, the image data received from the contone processing unit 4 for the outer edge pixels and the inner edge pixels, and selects the image data received from the screen processing unit 5 for the pixels which are neither the outer edge pixels nor the inner edge pixels, and output the selected image data.

The image data after screen processing, the gradation of which is expressed by assemblage of dots, may have an ambiguous outline depending on presence or absence of dots on the line. In contrast, the image data after the contone processing has the pixel values of the individual pixels directly reflected on the dots, so that the outline of image may be emphasized more strongly than in the other area after the screen processing, by selecting the image data after the contone processing for the edge pixels.

Figure 8:
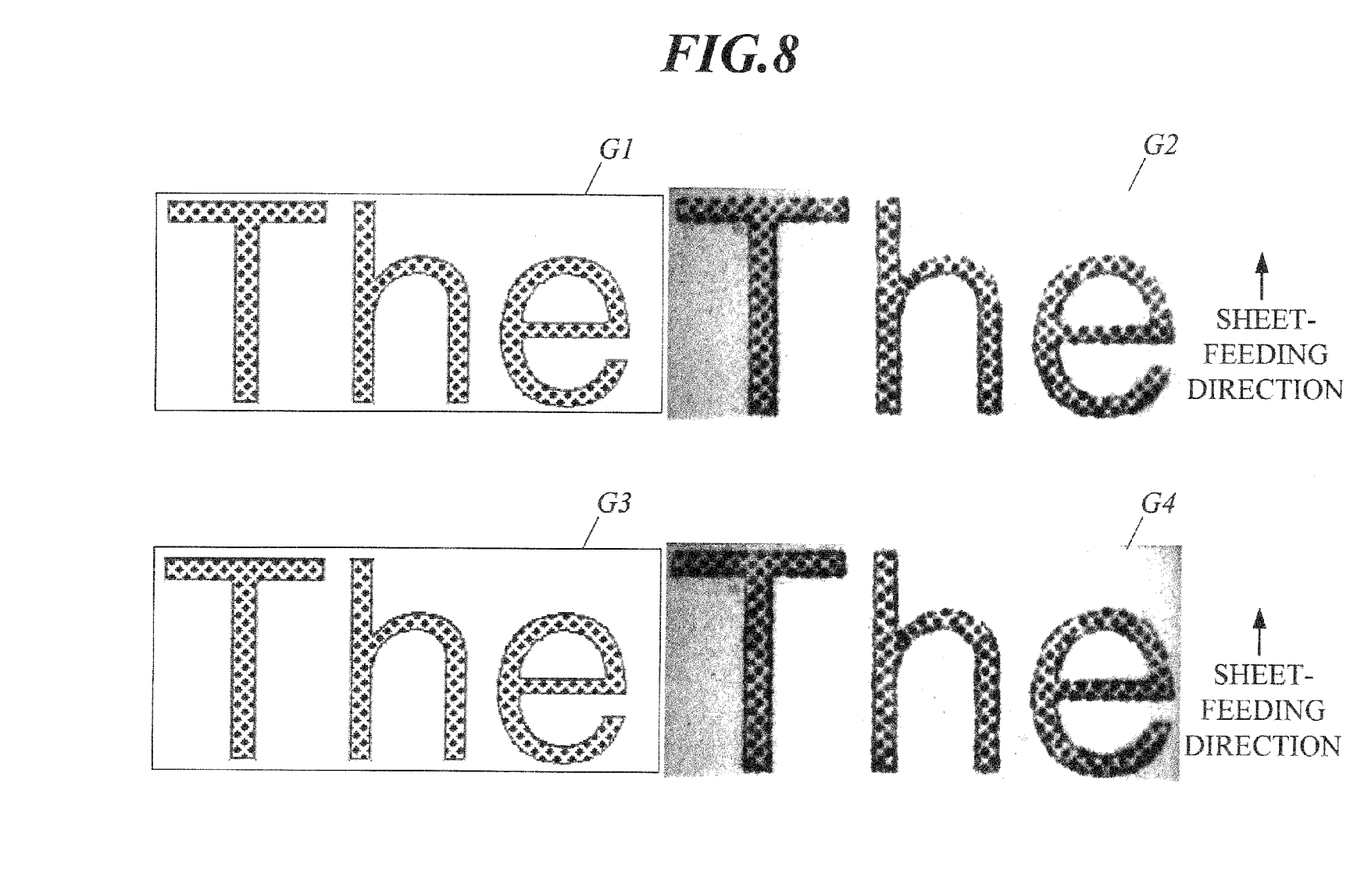
FIG. 8 is a drawing illustrating results of correction in Example and Comparative Example.

FIG. 8 illustrates results of correction of front end fading and sweep-up by the image processing method described in the above.

Image data G1 corresponds to Comparative Example, and image G2 is a printing result of the image data G1 printed on a sheet of paper. The image data G1 was obtained from the selection unit 6 which was fed with the thinned image data respectively by the contone processing unit 4 and the screen processing unit 5, without correction of front end fading and sweep-up by the outline adjusting unit 3.

Image data G3 corresponds to Example, and image G4 is a printing result of the image data G3 printed on a sheet of paper. The image data G3 was obtained from the selection unit 6 which was fed with the thinned image data by the contone processing unit 4 after the correction of front end fading and sweep-up by the outline adjusting unit 3, and was concomitantly fed with the thinned image data by the screen processing unit 5.

As seen in FIG. 8, both of the image data G1, G3 have emphasized outlines of characters as a result of the thinning processing. The image G2 obtained by printing the image data G1, however, showed decrease in the density of characters on the front end side of the sheet-feeding direction, which is known as front end fading. A part of the outlines of the characters disappeared, and thereby sharpness of the characters was found to be lost. On the other hand, the density was found to increase on the rear end side of the sheet-feeding direction, which is known as sweep-up.

In contrast, the image data G3 in Example showed increase in the pixel values of the character images on the front end side of the sheet-feeding direction, and showed decrease on the rear end side, as compared with the image data G1 in Comparative Example. As a consequence, the printed image G4 showed uniformity in the density both on the front end side and the rear end side of the sheet-feeding direction, proving clearance of front end fading and sweep-up. The result also showed an uniform decrease in the density of outline of characters as a whole, proving the effect of thinning.

The front end fading is thus cleared by the configuration described in the above. Since the correction value of front end fading is reduced depending on the ratio of reduction of the pixel value after being thinned, so that the effect of thinning may be expressed on the outer edge pixels. Accordingly, the correction of front end fading, adaptive to thinning, is now available.

Also sweep-up may be cleared. Since the correction value of sweep-up is reduced depending on the ratio of reduction of the pixel value after being thinned, so that excessive thinning on the outer edge is avoidable. Accordingly, the correction of sweep-up, adaptive to thinning, is now available.

Having described the present invention referring to the preferred embodiment, it is to be understood that the embodiment is merely illustrative and not restrictive, and may be modified without departing from the spirit of the present invention.

For example, while the embodiment described in the above dealt with the case where both of sweep-up and front end fading are corrected, also a configuration of correcting only one of them is adoptable.

While the edge direction described in the above was classified into 8 directions, the classification may be finer, and the number of correction values selectable for the individual edge directions may be increased. This enables correction of higher accuracy.

While the embodiment described in the above dealt with the case where the correction values Tn were determined based on the edge direction only, irrespective of the edge classification between the outer edge and the inner edge, the correction values Tn may alternatively be determined based on combinations of the edge direction and the edge classification. Since the outer edge pixel causes larger decrease in density due to front end fading or larger increase in density due to sweep-up, as compared with the inner edge pixel, so that the degree of correction is adjustable by selecting the correction value Tn depending on whether the edge classification is outer edge or inner edge, and thereby the accuracy of correction may be improved.

For example, if the target pixel is the outer edge pixel and the edge direction value P thereof lies in the direction same as the sheet-feeding direction, the edge direction processing unit 31 determines the positive correction value T1, representing the largest degree of correction, as the correction value of front end fading. On the other hand, if the target pixel is the outer edge pixel and the edge direction value P thereof lies in an oblique direction close to the sheet-feeding direction, or, if the target pixel is the inner edge pixel and the edge direction value P thereof lies in the direction same as, or close to, the sheet-feeding direction, the edge direction processing unit 31 determines the positive correction value T2, representing the second largest degree of correction.

Note that the number of correction values Tn may be increased so as to expand a range of selection of the correction values, depending on the edge direction value P and the edge classification. This improves the accuracy of correction.

Operations of the individual units of the image processing device 10 may be programmed, so as to make hardware, such as CPU (Central Processing Unit), read the program, and execute a series of image processing including thinning, correction of front end fading and sweep-up, gamma correction, and screen processing. Computer-readable media available herein to store the program include non-volatile memories such as ROM and flash memory, and portable recording media such as CD-ROM. Also carrier wave is adoptable as a medium which provides the program data through a communication line.

According to a first aspect of the present invention, there is provided an image processing device which includes: an outline detection unit which analyzes image data to detect an outer edge pixel forming the outline of image, and to determine an edge direction of the outer edge pixel; a thinning unit which processes thinning by reducing a pixel value of the outer edge pixel; and an outline adjusting unit which determines a correction value of front end fading to be adopted to the outer edge pixel, depending on sheet-feeding direction when the image data is printed and the edge direction of the outer edge pixel, reduces the correction value of front end fading, depending on the ratio of reduction by the thinning of the pixel value of the outer edge pixel, and corrects the front end fading by adding the reduced correction value to the pixel value of the outer edge pixel.

According to the present invention, front end fading may be corrected by addition of the correction value of front end fading. Since the correction value is reduced depending on the ratio of reduction of the pixel value having been reduced by thinning, so that the effect of thinning may be expressed on the outer edge pixels, and thereby the correction of front end fading, adaptive to thinning, is now available.

Preferably, the outline detection unit detects an inner edge pixel forming an outline recessed by one pixel from the outer edge, and determines the edge direction of the inner edge pixel, and the outline adjusting unit: determines a correction value of front end fading to be adopted to the inner edge pixel, depending on the sheet-feeding direction and the edge direction of the inner edge pixel; divides the correction value determined for the outer edge pixel, depending on the ratio of reduction by thinning of the pixel value of the outer edge pixel, and assigns one of the divided correction values to the outer edge pixel, and the other of the divided correction values to the inner edge pixel in adjacent to the outer edge pixel in the edge direction of the pixel; and corrects the front end fading, by adding the one of the divided correction values to the pixel value of the outer edge pixel; and by adding the correction value of front end fading determined for the inner edge pixel and the other of the divided correction values to the pixel value of the inner edge pixel.

Preferably, the correction value is a constant value to when the pixel value to be added with the correction value is larger than a predetermined value d, whereas the correction value is a value obtained by multiplying tn/d by the pixel value when the pixel value is smaller than the predetermined value.

Preferably, the outline adjusting unit implements gamma correction of the inner edge pixel, so as to adjust the pixel value thereof.

Preferably, the image processing device further includes: a contone processing unit which implements contone processing of the image data output from the outline adjusting unit; a screen processing unit which implements screen processing of the image data output from the thinning unit; and a selection unit which selectively outputs the image data after the contone processing for the outer edge pixel and the inner edge pixel, and selectively outputs the image data after the screen processing for the pixel which is neither the outer edge pixel nor the inner edge pixel.

According to a second aspect of the present invention, there is provided an image processing device which includes: an outline detection unit which analyzes image data to detect an outer edge pixel forming the outline of image, and to determine an edge direction of the outer edge pixel; a thinning unit which processes thinning by reducing a pixel value of the outer edge pixel; and an outline adjusting unit which determines a correction value of sweep-up to be adopted to the outer edge pixel, depending on sheet-feeding direction when the image data is printed and the edge direction of the outer edge pixel, reduces the correction value of sweep-up, depending on the ratio of reduction by the thinning of the pixel value of the outer edge pixel, and corrects the sweep-up by adding the reduced correction value to the pixel value of the outer edge pixel.

According to the present invention, sweep-up may be corrected by addition of the correction value of sweep-up. Since the correction value is reduced depending on the ratio of reduction of the pixel value having been reduced by thinning, so that excessive thinning of the outer edge pixel is avoidable, and thereby the correction of sweep-up, adaptive to thinning, is now available.

Preferably, the outline detection unit detects an inner edge pixel forming an outline recessed by one pixel from the outer edge, and determines the edge direction of the inner edge pixel, and the outline adjusting unit: determines a correction value of sweep-up to be adopted to the inner edge pixel, depending on the sheet-feeding direction and the edge direction of the inner edge pixel; divides the correction value determined for the outer edge pixel, depending on the ratio of reduction by thinning of the pixel value of the outer edge pixel, and assigns one of the divided correction values to the outer edge pixel, and the other of the divided correction values to the inner edge pixel in adjacent to the outer edge pixel in the edge direction of the pixel; and corrects the sweep-up, by adding the one of the divided correction values to the pixel value of the outer edge pixel; and by adding the correction value of sweep-up determined for the inner edge pixel and the other of the divided correction values to the pixel value of the inner edge pixel.

Preferably, the correction value is a constant value to when the pixel value to be added with the correction value is larger than a predetermined value d, whereas the correction value is a value obtained by multiplying tn/d by the pixel value when the pixel value is smaller than the predetermined value.

Preferably, the outline adjusting unit implements gamma correction of the inner edge pixel, so as to adjust the pixel value thereof.

Preferably, the image processing device further includes: a contone processing unit which implements contone processing of the image data output from the outline adjusting unit; a screen processing unit which implements screen processing of the image data output from the thinning unit; and a selection unit which selectively outputs the image data after the contone processing for the outer edge pixel and the inner edge pixel, and selectively outputs the image data after the screen processing for the pixel which is neither the outer edge pixel nor the inner edge pixel.

According to a third aspect of the present invention, there is provided an image processing method which includes: detecting an outer edge pixel forming the outline of image from the individual pixels of image data; determining the edge direction of the outer edge pixel; thinning the detected outer edge pixel by reducing a pixel value of the outer edge pixel; determining a correction value of front end fading to be adopted to the outer edge pixel, depending on sheet-feeding direction when the image data is printed and the edge direction of the outer edge pixel; reducing the correction value of front end fading, depending on the ratio of reduction by the thinning of the pixel value of the outer edge pixel; and correcting the front end fading by adding the reduced correction value to the pixel value of the outer edge pixel.

According to the present invention, front end fading may be corrected by addition of the correction value of front end fading. Since the correction value is reduced depending on the ratio of reduction of the pixel value having been reduced by thinning, so that the effect of thinning may be expressed on the outer edge pixels, and thereby the correction of front end fading, adaptive to thinning, is now available.

Preferably, the detecting includes: detecting an inner edge pixel forming an outline recessed by one pixel from the outer edge; determining the edge direction of the inner edge pixel; determining a correction value of front end fading to be adopted to the inner edge pixel, depending on the sheet-feeding direction and the edge direction of the inner edge pixel; dividing the correction value determined for the outer edge pixel depending on the ratio of reduction by thinning of the pixel value of the outer edge pixel; assigning one of the divided correction values to the outer edge pixel, and the other of the divided correction values to the inner edge pixel in adjacent to the outer edge pixel in the edge direction of the pixel; and correcting the front end fading, by adding the one of the divided correction values to the pixel value of the outer edge pixel; and by adding the correction value of front end fading determined for the inner edge pixel and the other of the divided correction values to the pixel value of the inner edge pixel.

Preferably, the correction value is a constant value to when the pixel value to be added with the correction value is larger than a predetermined value d, whereas the correction value is a value obtained by multiplying tn/d by the pixel value when the pixel value is smaller than the predetermined value.

Preferably, the image processing method further includes implementing gamma correction of the inner edge pixel, so as to adjust the pixel value thereof.

Preferably, the image processing method further includes: implementing contone processing of the image data after the correcting; implementing screen processing of the image data after the thinning; and selectively outputting the image data after the contone processing for the outer edge pixel and the inner edge pixel, and selectively outputting the image data after the screen processing for the pixel which is neither the outer edge pixel nor the inner edge pixel.

According to a fourth aspect of the present invention, there is provided an image processing method which includes: detecting an outer edge pixel forming the outline of image from the individual pixels of image data; determining the edge direction of the outer edge pixel; thinning the detected outer edge pixel by reducing a pixel value of the outer edge pixel; determining a correction value of sweep-up to be adopted to the outer edge pixel, depending on sheet-feeding direction when the image data is printed and the edge direction of the outer edge pixel; reducing the correction value of sweep-up, depending on the ratio of reduction by the thinning of the pixel value of the outer edge pixel; and correcting the sweep-up by adding the reduced correction value to the pixel value of the outer edge pixel.

According to the present invention, sweep-up may be corrected by addition of the correction value of sweep-up. Since the correction value is reduced depending on the ratio of reduction of the pixel value having been reduced by thinning, so that excessive thinning of the outer edge pixel is avoidable, and thereby the correction of sweep-up, adaptive to thinning, is now available.

Preferably, the detecting includes: detecting an inner edge pixel forming an outline recessed by one pixel from the outer edge; determining the edge direction of the inner edge pixel; determining a correction value of sweep-up to be adopted to the inner edge pixel, depending on the sheet-feeding direction and the edge direction of the inner edge pixel; dividing the correction value determined for the outer edge pixel depending on the ratio of reduction by thinning of the pixel value of the outer edge pixel; assigning one of the divided correction values to the outer edge pixel, and the other of the divided correction values to the inner edge pixel in adjacent to the outer edge pixel in the edge direction of the pixel; and correcting the sweep-up, by adding the one of the divided correction values to the pixel value of the outer edge pixel; and by adding the correction value of sweep-up determined for the inner edge pixel and the other of the divided correction values to the pixel value of the inner edge pixel.

Preferably, the correction value is a constant value to when the pixel value to be added with the correction value is larger than a predetermined value d, whereas the correction value is a value obtained by multiplying tn/d by the pixel value when the pixel value is smaller than the predetermined value.

Preferably, the image processing method further includes implementing gamma correction of the inner edge pixel, so as to adjust the pixel value thereof.

Preferably, the image processing method further includes: implementing contone processing of the image data after the correcting; implementing screen processing of the image data after the thinning; and selectively outputting the image data after the contone processing for the outer edge pixel and the inner edge pixel, and selectively outputting the image data after the screen processing for the pixel which is neither the outer edge pixel nor the inner edge pixel.

CROSS-REFERENCE TO RELATED APPLICATION

The present U.S. patent application claims a priority under the Paris Convention of Japanese patent application No. 2011-192491 filed on Sep. 5, 2011 which shall be a basis of correction of an incorrect translation, and is incorporated by reference herein.

What is claimed is:
1. An image processing device comprising:
a CPU which is configured to function as:
an outline detection unit which analyzes image data to detect an outer edge pixel forming an outline of the image data, and to determine an edge direction of the outer edge pixel;
a thinning unit which processes thinning by reducing a pixel value of the outer edge pixel; and
an outline adjusting unit which (i) determines a correction value of front end fading to be adopted to the outer edge pixel, depending on a sheet-feeding direction when the image data is printed and the edge direction of the outer edge pixel, (ii) reduces the correction value of front end fading, depending on a ratio of reduction by the thinning of the pixel value of the outer edge pixel, and (iii) corrects the front end fading by adding the reduced correction value to the pixel value of the outer edge pixel.

2. The image processing device of claim 1, wherein the outline detection unit detects an inner edge pixel forming an outline recessed by one pixel from the outer edge pixel, and determines an edge direction of the inner edge pixel, and wherein the outline adjusting unit:

determines a correction value of front end fading to be adopted to the inner edge pixel, depending on the sheet-feeding direction and the edge direction of the inner edge pixel;

divides the correction value determined for the outer edge pixel, depending on the ratio of reduction by thinning of the pixel value of the outer edge pixel, to obtain divided correction values, and assigns one of the divided correction values to the outer edge pixel, and assigns another of the divided correction values to the inner edge pixel which is adjacent to the outer edge pixel in the edge direction of the outer edge pixel; and corrects the front end fading, by adding the one of the divided correction values to the pixel value of the outer edge pixel, and by adding the correction value of front end fading determined for the inner edge pixel and said another of the divided correction values to a pixel value of the inner edge pixel.

3. The image processing device of claim 1, wherein, when a pixel value of a pixel to which the correction value is to be added is larger than a predetermined value d, the outline adjusting unit determines the correction value to be a constant value, and when the pixel value of the pixel to which the correction value is to be added is smaller than or equal to the predetermined value d, the outline adjusting unit determines the correction value to be a value obtained by multiplying tn/d by the pixel value, where to is a constant value.

4. The image processing device of claim 2, wherein the outline adjusting unit implements gamma correction of the inner edge pixel, so as to adjust the pixel value of the inner edge pixel.

5. The image processing device of claim 2, wherein the CPU is further configured to function as:
a contone processing unit which implements contone processing of the image data output from the outline adjusting unit;
a screen processing unit which implements screen processing of the image data output from the thinning unit; and
a selection unit which selectively outputs the image data after the contone processing for the outer edge pixel and the inner edge pixel, and selectively outputs the image data after the screen processing for a pixel which is neither the outer edge pixel nor the inner edge pixel.

6. An image processing device comprising:
a CPU which is configured to function as:
an outline detection unit which analyzes image data to detect an outer edge pixel forming an outline of the image data, and to determine an edge direction of the outer edge pixel;
a thinning unit which processes thinning by reducing a pixel value of the outer edge pixel; and
an outline adjusting unit which (i) determines a correction value of sweep-up to be adopted to the outer edge pixel, depending on a sheet-feeding direction when the image data is printed and the edge direction of the outer edge pixel, (ii) reduces the correction value of sweep-up, depending on a ratio of reduction by the thinning of the pixel value of the outer edge pixel, and (iii) corrects the sweep-up by adding the reduced correction value to the pixel value of the outer edge pixel.

7. The image processing device of claim 6, wherein the outline detection unit detects an inner edge pixel forming an outline recessed by one pixel from the outer edge pixel, and determines an edge direction of the inner edge pixel, and wherein the outline adjusting unit:

determines a correction value of sweep-up to be adopted to the inner edge pixel, depending on the sheet-feeding direction and the edge direction of the inner edge pixel;

divides the correction value determined for the outer edge pixel, depending on the ratio of reduction by thinning of the pixel value of the outer edge pixel, to obtain divided correction values, and assigns one of the divided correction values to the outer edge pixel, and assigns another of the divided correction values to the inner edge pixel which is adjacent to the outer edge pixel in the edge direction of the outer edge pixel; and corrects the sweep-up, by adding the one of the divided correction values to the pixel value of the outer edge pixel, and by adding the correction value of sweep-up determined for the inner edge pixel and said another of the divided correction values to a pixel value of the inner edge pixel.

8. The image processing device of claim 6, wherein, when a pixel value of a pixel to which the correction value is to be added is larger than a predetermined value d, the outline adjusting unit determines the correction value to be a constant value, and, when the pixel value of the pixel to which the correction value is to be added is smaller than or equal to the predetermined value d, the outline adjusting unit determines the correction value to be a value obtained by multiplying tn/d by the pixel value, where to is a constant value.

9. The image processing device of claim 7, wherein the outline adjusting unit implements gamma correction of the inner edge pixel, so as to adjust the pixel value of the inner edge pixel.

10. The image processing device of claim 7, wherein the CPU is further configured to function as:

a contone processing unit which implements contone processing of the image data output from the outline adjusting unit;

a screen processing unit which implements screen processing of the image data output from the thinning unit; and a selection unit which selectively outputs the image data after the contone processing for the outer edge pixel and the inner edge pixel, and selectively outputs the image data after the screen processing for a pixel which is neither the outer edge pixel nor the inner edge pixel.

11. An image processing method for an image processing device comprising a CPU, the method comprising controlling the CPU to implement processes comprising:

detecting an outer edge pixel forming an outline of image data from among individual pixels of the image data;

determining an edge direction of the outer edge pixel;

thinning the detected outer edge pixel by reducing a pixel value of the outer edge pixel;

determining a correction value of front end fading to be adopted to the outer edge pixel, depending on a sheet-feeding direction when the image data is printed and the edge direction of the outer edge pixel;

reducing the correction value of front end fading, depending on a ratio of reduction by the thinning of the pixel value of the outer edge pixel; and correcting the front end fading by adding the reduced correction value to the pixel value of the outer edge pixel.

12. The image processing method of claim 11, further comprising controlling the CPU to implement processes comprising:

detecting an inner edge pixel forming an outline recessed by one pixel from the outer edge pixel;

determining an edge direction of the inner edge pixel;

determining a correction value of front end fading to be adopted to the inner edge pixel, depending on the sheet-feeding direction and the edge direction of the inner edge pixel;

dividing the correction value determined for the outer edge pixel depending on the ratio of reduction by thinning of the pixel value of the outer edge pixel, to obtain divided correction values;

assigning one of the divided correction values to the outer edge pixel, and another of the divided correction values to the inner edge pixel which is adjacent to the outer edge pixel in the edge direction of the outer edge pixel; and correcting the front end fading, by adding the one of the divided correction values to the pixel value of the outer edge pixel, and by adding the correction value of front end fading determined for the inner edge pixel and said another of the divided correction values to a pixel value of the inner edge pixel.

13. The image processing method of claim 11, wherein when a pixel value of a pixel to which the correction value is to be added is larger than a predetermined value d, the correction value is determined to be a constant value, and when the pixel value of the pixel to which the correction value is to be added is smaller than or equal to the predetermined value d, the correction value is determined to be a value obtained by multiplying tn/d by the pixel value, where to is a constant value.

14. The image processing method of claim 12, further comprising controlling the CPU to implement processes comprising implementing gamma correction of the inner edge pixel, so as to adjust the pixel value of the inner edge pixel.

15. The image processing method of claim 12, further comprising controlling the CPU to implement processes comprising:

implementing contone processing of the image data after the correcting;

implementing screen processing of the image data after the thinning; and selectively outputting the image data after the contone processing for the outer edge pixel and the inner edge pixel, and selectively outputting the image data after the screen processing for a pixel which is neither the outer edge pixel nor the inner edge pixel.

16. An image processing method for an image processing device comprising a CPU, the method comprising controlling the CPU to implement processes comprising:

detecting an outer edge pixel forming an outline of image data from among individual pixels of the image data;

determining an edge direction of the outer edge pixel;

thinning the detected outer edge pixel by reducing a pixel value of the outer edge pixel;

determining a correction value of sweep-up to be adopted to the outer edge pixel, depending on a sheet-feeding direction when the image data is printed and the edge direction of the outer edge pixel;

reducing the correction value of sweep-up, depending on a ratio of reduction by the thinning of the pixel value of the outer edge pixel; and correcting the sweep-up by adding the reduced correction value to the pixel value of the outer edge pixel.

17. The image processing method of claim 16, further comprising controlling the CPU to implement processes comprising:

detecting an inner edge pixel forming an outline recessed by one pixel from the outer edge pixel;

determining an edge direction of the inner edge pixel;

determining a correction value of sweep-up to be adopted to the inner edge pixel, depending on the sheet-feeding direction and the edge direction of the inner edge pixel;

dividing the correction value determined for the outer edge pixel depending on the ratio of reduction by thinning of the pixel value of the outer edge pixel, to obtain divided correction values;

assigning one of the divided correction values to the outer edge pixel, and assigning another of the divided correction values to the inner edge pixel which adjacent to the outer edge pixel in the edge direction of the outer edge pixel; and correcting the sweep-up, by adding the one of the divided correction values to the pixel value of the outer edge pixel, and by adding the correction value of sweep-up determined for the inner edge pixel and said another of the divided correction values to a pixel value of the inner edge pixel.

18. The image processing method of claim 16, wherein when a pixel value of a pixel to which the correction value is to be added is larger than a predetermined value d, the correction value is determined to be a constant value, and when the pixel value of the pixel to which the correction value is to be added is smaller than or equal to the predetermined value d, the correction value is determined to be a value obtained by multiplying tn/d by the pixel value, where to is a constant value.

19. The image processing method of claim 17, further comprising controlling the CPU to implement processes comprising implementing gamma correction of the inner edge pixel, so as to adjust the pixel value of the inner edge pixel.

20. The image processing method of claim 17, further comprising controlling the CPU to implement processes comprising:

implementing contone processing of the image data after the correcting;

implementing screen processing of the image data after the thinning; and selectively outputting the image data after the contone processing for the outer edge pixel and the inner edge pixel, and selectively outputting the image data after the screen processing for a pixel which is neither the outer edge pixel nor the inner edge pixel.

* * * * *